No. 702,803. Patented June 17, 1902.
E. L. LEMBKE.
SPRING CLAMP FOR LENSES OR THE LIKE.
(Application filed Dec. 26, 1901.)
(No Model.)
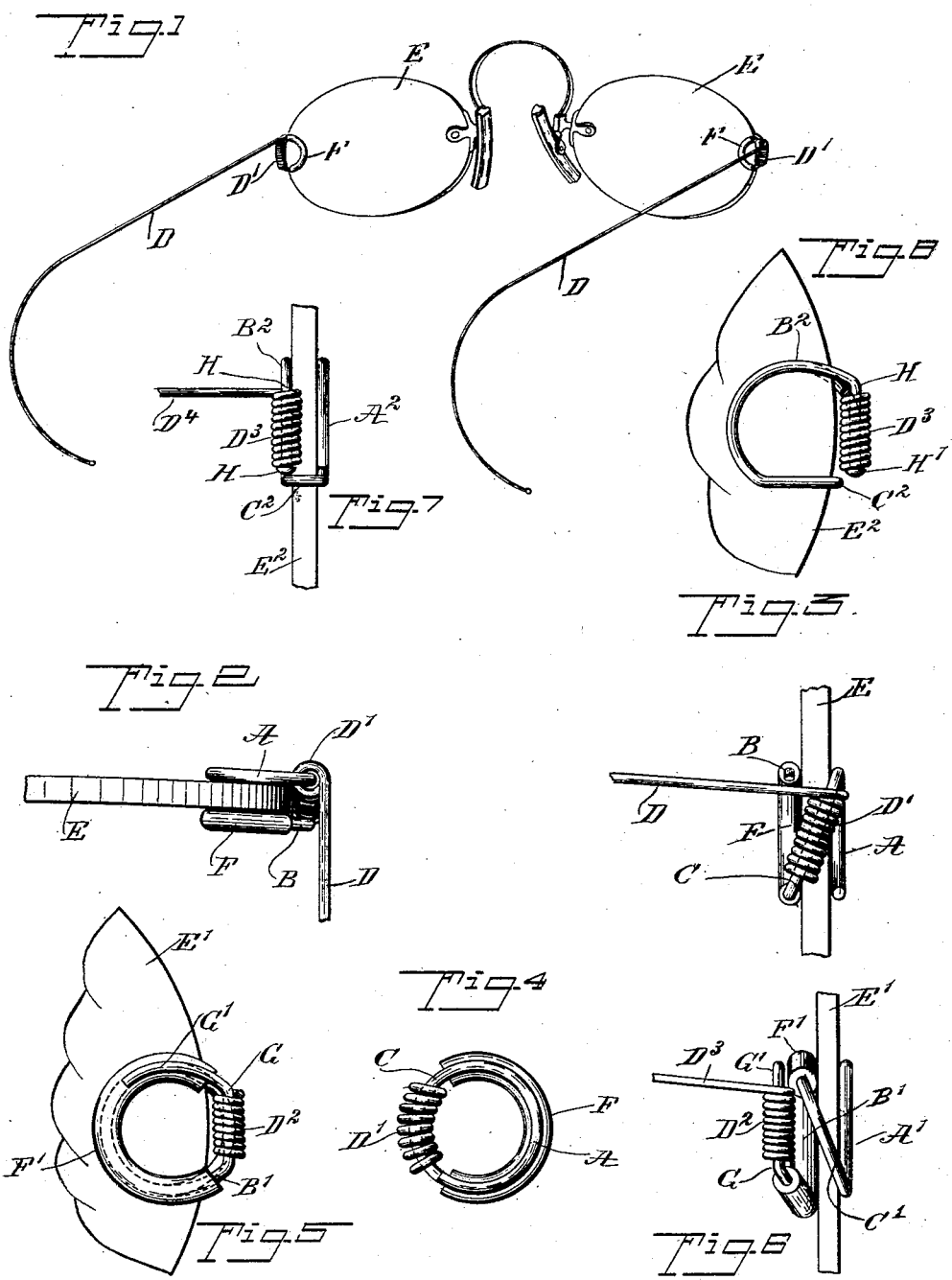
WITNESSES:
INVENTOR
Emil L. Lembke
BY
ATTORNEYS

UNITED STATES PATENT OFFICE.

EMIL L. LEMBKE, OF NEW YORK, N. Y.

SPRING-CLAMP FOR LENSES OR THE LIKE.

SPECIFICATION forming part of Letters Patent No. 702,803, dated June 17, 1902.

Application filed December 26, 1901. Serial No. 87,252. (No model.)

*To all whom it may concern:*

Be it known that I, EMIL L. LEMBKE, a citizen of the United States, and a resident of the city of New York, borough of Manhattan, in the county and State of New York, have invented a new and Improved Spring-Clamp for Lenses or the Like, of which the following is a full, clear, and exact description.

The object of the invention is to provide a new and improved spring-clamp for carrying temples, bridges, and other articles for use on the lenses of eyeglasses, spectacles, and the like and arranged for convenient, quick, and secure attachment to or removal from the lenses and without requiring apertures in the lenses and bolts, pins, or similar fastening devices.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement arranged for carrying temples for eyeglasses. Fig. 2 is an enlarged plan view of the same. Fig. 3 is an edge view of the same. Fig. 4 is a front elevation of the improvement. Fig. 5 is the rear face view of a modified form of the improvement. Fig. 6 is an edge view of the same. Fig. 7 is an edge view of another modified form of the improvement, and Fig. 8 is a front view of the same.

The improved spring-clamp, as shown in Figs. 1 to 4, inclusive, consists, essentially, of a single piece of spring-wire formed into a spiral eye, having the front and rear clamping members A and B and the middle portion C for receiving the eye D' of the temple D, the said clamping members A and B registering or overlying each other and when spread apart are adapted to engage opposite faces of the lens E, as plainly shown in Figs. 2 and 3. The middle portion C then extends obliquely adjacent to the end of the lens E, as indicated in Fig. 3. The rear clamping member B is provided with a covering F, preferably in the shape of a tubular piece of rubber, to increase the adhesion of the clamp on the smooth faces of the lens, especially as the resiliency of the spring metal of the clamp tends to flatten the covering at the point of contact with the corresponding lens-face to securely hold the clamp in position.

By reference to Fig. 4 it will be seen that the eye is formed of a spiral somewhat more than one convolution to produce the registering members A and B and the middle portion C and to allow the eye D' of the temple D to engage the middle portion without interference with either of the clamping members A or B. Furthermore, the arrangement described allows the middle portion to extend outside the edge of the lens E, at the same time conforming approximately to the curvature of the edge, so that the temple can be readily swung into an open or closed position.

In using the clamp the operator forces the clamping members apart, and then the lens is passed edgewise between the members, after which the latter are relieved of pressure to allow the resiliency of the clamp to bring the members toward each other and in firm contact with the faces of the lens.

If desired, the rear or inner member B' may have an extension G for forming a pivot for the spiral eye $D^2$ of the temple $D^3$, as plainly shown in Figs. 5 and 6. In this case the extension forms a radial pivot arranged approximately parallel to the face of the lens, so that the eye $D^2$ is likewise straight and allows an easy swinging of the temple. The extension G terminates in a curved end G', adapted to press on one end of the covering F' to increase the adhesive power of the said covering on the face of the lens E'.

The front member A' and the middle portion C' of this clamp are the same as above described in reference to the member A and the middle portion C, it being understood that the lens E' is clamped between the front and rear clamping members A' and B'.

As illustrated in Figs. 7 and 8, the registering members $A^2$ and $B^2$ are connected with each other by a middle portion $C^2$, which extends transversely outside of the edge of the lens $E^2$, and the end of the rear member $B^2$ is formed with a vertical pivot-pin H, engaged by the spiral eye $D^3$ of the temple $D^4$, the end of the pivot-pin H having a head H' to hold the eye $D^3$ in front of the pivot-pin.

The device is very simple and durable in construction, can be cheaply manufactured, and a pair of clamps and temples can be readily applied to the lenses of a pair of eyeglasses, as shown in Fig. 1, so as to securely hold the said eyeglasses in position when in use. I do not limit myself to the particular use of the clamp as above described, as it is evident that the clamp may be used for other purposes without deviating from my invention.

Having thus described my invention, I claim as new and desire to secure by Letters Patent—

1. A spring-clamp for lenses and the like made of a single piece of spring-wire, and comprising registering front and rear members clamping opposite faces of the lens, each member being formed to inclose a face portion of the lens adjacent to the edge thereof, and a connecting portion connecting at each end with an end of the face members to leave the other ends of the face members free, as set forth.

2. A spring-clamp for lenses and the like made of a single piece of spring-wire, and comprising registering front and rear members clamping opposite faces of the lens, each member being formed to inclose a face portion of the lens adjacent to the edge thereof, a connecting portion connecting at each end with an end of the face members to leave the other ends of the face members free, and a pivot-pin integral with the end of one of the face members for the temple to swing on, as set forth.

3. A spring-clamp for lenses and the like made of a single piece of spring-wire, and comprising registering front and rear members clamping opposite faces of the lens, each member being formed to inclose a face portion of the lens adjacent to the edge thereof, a connecting portion connecting at each end with an end of the face members to leave the other ends of the face members free, a pivot-pin integral with the end of one of the face members for the temple to swing on, and a piece of rubber tubing on one of the face members, as set forth.

In testimony whereof I have signed my name to this specification in the presence of two subscribing witnesses.

EMIL L. LEMBKE.

Witnesses:
   THEO. G. HOSTER,
   EVERARD BOLTON MARSHALL.